(12) United States Patent
Lee et al.

(10) Patent No.: US 11,794,589 B2
(45) Date of Patent: Oct. 24, 2023

(54) MOTOR CONTROL SYSTEM OF VEHICLE AND METHOD THEREOF

(71) Applicants: Hyundai Motor Company, Seoul (KR); Kia Corporation, Seoul (KR)

(72) Inventors: Yonghoon Lee, Incheon (KR); Seong Ik Park, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 190 days.

(21) Appl. No.: 17/372,793

(22) Filed: Jul. 12, 2021

(65) Prior Publication Data

US 2022/0250484 A1 Aug. 11, 2022

(30) Foreign Application Priority Data

Feb. 10, 2021 (KR) .......... 10-2021-0019006

(51) Int. Cl.
 *B60L 15/20* (2006.01)
(52) U.S. Cl.
 CPC ........... *B60L 15/20* (2013.01); *B60L 2220/42* (2013.01); *B60L 2240/421* (2013.01); *B60L 2240/423* (2013.01); *B60L 2250/26* (2013.01)
(58) Field of Classification Search
 CPC .. B60L 15/20; B60L 15/2045; B60L 2220/42; B60L 2240/421; B60L 2240/423; B60L 2250/26; H02P 5/46; H02P 6/04; B60W 10/08; B60W 20/00; B60W 2510/081; B60W 2510/083; B60Y 2200/91; B60Y 2200/92; Y02T 90/40
 See application file for complete search history.

(56) References Cited

U.S. PATENT DOCUMENTS

2014/0018987 A1 1/2014 Kato et al.
2016/0347203 A1 12/2016 Leng et al.

FOREIGN PATENT DOCUMENTS

| CN | 106515509 A | * | 3/2017 |
| CN | 111016683 A | * | 4/2020 |
| EP | 3431326 A1 | | 1/2019 |
| JP | H0746721 A | * | 2/1995 |
| JP | H0746721 A | | 2/1995 |
| JP | 2007216932 A | | 8/2007 |

OTHER PUBLICATIONS

Extended European Search Report for European Application No. 21189376.3, dated Jan. 28, 2022, 8 pages.

* cited by examiner

*Primary Examiner* — Michael J Zanelli
(74) *Attorney, Agent, or Firm* — Fox Rothschild LLP

(57) ABSTRACT

A motor control system and a method thereof are provided for a vehicle having a plurality of motors as a driving power source. The system includes a request torque determination part that determines a request torque requested for the plurality of motors corresponding to a driver request torque. An optimal operating point torque determination part determines an optimal operating point torque for each of the plurality of motors according to a current rotation speed of each of the plurality of motors. An motor torque determination part then determines a target torque for each of the plurality of motors by distributing the request torque to the plurality of motors based on the optimal operating point torque.

15 Claims, 2 Drawing Sheets

MOTOR CONTROL SYSTEM OF VEHICLE AND METHOD THEREOF

CROSS-REFERENCE TO RELATED APPLICATION

This application claims priority to and the benefit of Korean Patent Application No. 10-2021-0019006 filed on Feb. 10, 2021, the entire contents of which are incorporated herein by reference.

BACKGROUND

(a) Field of the Disclosure

The present disclosure relates to a motor control system and a method thereof, and more particularly, to a motor control system and a method thereof for a vehicle having a plurality of motors as a driving power source.

(b) Description of the Related Art

Recently, as interest in the environment increases, the spread of environment-friendly vehicles is becoming active. An environment-friendly vehicle is a vehicle with less noxious exhaust gas, and uses a motor as the driving power source that provide driving torque to the vehicle. The environment-friendly vehicles include a pure electric vehicle (EV), a hybrid electric vehicle (HEV), and a fuel cell electric vehicle (FCEV).

For a vehicle in which a single motor is used as a driving power source, the torque requested to the motor must be accomplished by the single motor, and thus, it is difficult to consider the motor efficiency when adjusting the torque of the motor. However, for a vehicle driven by a plurality of motors, for example, arranged coaxially or with a specific gear ratio relationship, a relatively higher degree of freedom of torque determination may be provided compared to when a single motor is used.

The above information disclosed in this section is merely for enhancement of understanding of the background of the disclosure, and therefore it may contain information that does not form the prior art that is already known in this country to a person of ordinary skill in the art.

SUMMARY

The present disclosure intends to provide a motor control system and a method thereof for a vehicle having a plurality of motors as a driving power source, where efficient motor torque control may be enabled by using degree of freedom in determining torques for the plurality of motors.

An exemplary motor control system may include, a request torque determination part configured to determine a request torque requested for the plurality of motors corresponding to a driver request torque, an optimal operating point torque determination part configured to determine an optimal operating point torque for each of the plurality of motors according to a current rotation speed of each of the plurality of motors, and an motor torque determination part configured to determine a target torque for each of the plurality of motors by distributing the request torque to the plurality of motors based on the optimal operating point torque.

The motor torque determination part may be configured to obtain a difference value between the request torque and a summation value of the optimal operating point torque over all the plurality of motors, obtain a torque calibration value with respect to each of the plurality of motors by distributing a torque corresponding to the difference value to the plurality of motors, and determine the target torque by adding or subtracting the torque calibration value to or from the optimal operating point torque of each the plurality of motors.

The motor torque determination part may be configured to determine a torque distribution ratio for distributing a torque corresponding to the difference value to the plurality of motors according to a maximum limit torque of each of the plurality of motors. The motor torque determination part may be configured to determine the torque distribution ratio higher for a motor having higher maximum limit torque. The motor torque determination part may be configured to determine the maximum limit torque according to the current rotation speed of each of the plurality of motors. The motor torque determination part may be configured to, in response to determining that the summation value of the optimal operating point torque over all the plurality of motors is equal to the request torque, determine the optimal operating point torque of each of the plurality of motors as the target torque.

The motor control system may further include an optimal operating line torque map that defines the optimal operating point torque corresponding to an optimal operating line for each rotation speed with respect to each of the plurality of motors. The optimal operating point torque determination part may be configured to determine the optimal operating point of each of the plurality of motors using the optimal operating line torque map. The motor control system may further include a motor controller configured to execute operation of the plurality of motors based on the target torque.

In addition, an exemplary motor control method may include, determining a request torque requested for the plurality of motors corresponding to a driver request torque, determining an optimal operating point torque for each of the plurality of motors according to a current rotation speed of each of the plurality of motors, determining a target torque for each of the plurality of motors by distributing the request torque to the plurality of motors based on the optimal operating point torque, and operating the plurality of motors based on the target torque.

The determining of the target torque may include, obtaining a difference value between the request torque and a summation value of the optimal operating point torque over all the plurality of motors, obtaining a torque calibration value with respect to each of the plurality of motors by distributing a torque corresponding to the difference value to the plurality of motors, and obtaining the target torque by adding or subtracting the torque calibration value to or from the optimal operating point torque of each the plurality of motors.

Additionally, the determining of the target torque may include determining a torque distribution ratio for distributing a torque corresponding to the difference value to the plurality of motors according to a maximum limit torque of each of the plurality of motors. The obtaining of the torque calibration value may include distributing a torque corresponding to the difference value to the plurality of motors according to the torque distribution ratio of each of the plurality of motors.

The determining of the torque distribution ratio may include determining the torque distribution ratio higher for a motor having higher maximum limit torque. The determining of the target torque may further include determining the maximum limit torque according to the current rotation speed of each of the plurality of motors. The determining of the target torque may include determining the optimal operating point torque of each of the plurality of motors as the target torque, in response to determining that a summation value of the optimal operating point torque over all the plurality of motors is equal to the request torque. The optimal operating point torque may be a torque value corresponding to the current rotation speed in an optimal operating line of each of the plurality of motors.

According to an exemplary embodiment, in a vehicle having a plurality of motors as a driving power source, maximum efficiency of respective motors may be considered to adjust output torques of the respective motors, thereby enabling efficient control of motor torque, improving fuel efficiency, and improving marketability of a vehicle.

BRIEF DESCRIPTION OF THE DRAWINGS

The objects, features and advantages of the present disclosure will be more apparent from the following detailed description in conjunction with the accompanying drawings, in which.

DETAILED DESCRIPTION

Figure 1:
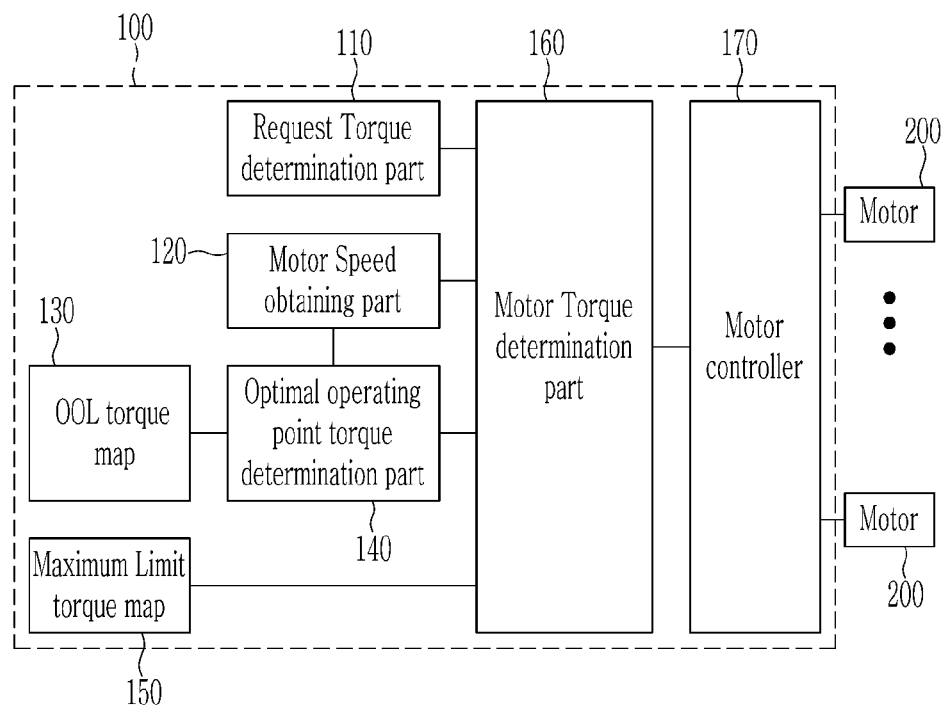
FIG. 1 schematically illustrates a motor control system of a vehicle according to an exemplary embodiment.

Hereinafter, exemplary embodiments disclosed in the present specification will be described in detail with reference to the accompanying drawings. In the present specification, the same or similar components will be denoted by the same or similar reference numerals, and a repeated description thereof will be omitted.

Terms "module", "part", "means" and/or "unit" for components used in the following description are used only in order to easily describe the specification. Therefore, these terms do not have meanings or roles that distinguish them from each other in and of themselves. In describing exemplary embodiments of the present specification, when it is determined that a detailed description of the well-known art associated with the present disclosure may obscure the gist of the present disclosure, it will be omitted. The accompanying drawings are provided only in order to allow exemplary embodiments disclosed in the present specification to be easily understood and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various components, and are not to be interpreted as limiting these components. The terms are only used to differentiate one component from other components.

It is to be understood that when one component is referred to as being "connected" or "coupled" to another component, it may be connected or coupled directly to the other component or may be connected or coupled to the other component with a further component intervening therebetween. Further, it is to be understood that when one component is referred to as being "directly connected" or "directly coupled" to another component, it may be connected or coupled directly to the other component without a further component intervening therebetween.

It will be further understood that terms "comprise" and "have" used in the present specification specify the presence of stated features, numerals, steps, operations, components, parts, or combinations thereof, but do not preclude the presence or addition of one or more other features, numerals, steps, operations, components, parts, or combinations thereof.

In addition, terms such as "part", "means", "module", "unit" and the like used in the specification means a unit for processing at least one function or operation, and an element referred to as such may be implemented by a hardware, a software, or a combination of hardware and software.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

FIG. 1 schematically illustrates a motor control system of a vehicle according to an exemplary embodiment, and as an example, illustrates that a plurality of motors are mounted in front of a transmission and are used as a driving power source to provide a driving torque to the vehicle. Referring to FIG. 1, a motor control system 100 of vehicle according to an exemplary embodiment may include, a request torque determination part 110, a motor speed obtaining part 120, an optimal operating line (OOL) torque map 130, an optimal operating point torque determination part 140, a maximum limit torque map 150, a motor torque determination part 160, and a motor controller 170. Each of these components or parts may be operated by an overall controller.

The request torque determination part 110 may be configured to collect, in real time, vehicle driving information such as an accelerator pedal operation status, a brake pedal operation status, and the like of the vehicle, vehicle status information such as a gear stage, a vehicle speed, an engine speed (for example, in rpm), a state of charge (SOC), and the like, and environmental parameter such as road information and the like, and may be configured to determine a driver's request torque based on the collected information.

When the driver's request torque is determined, the request torque determination part 110 may be configured to determine a request torque (hereinafter, called a "motor request torque") requested to a plurality of motors 200. In particular, the determined motor request torque is a torque requested to all of the plurality of motors 200. The motor request torque may be determined from driver request torque according to various known schemes, and such is not described in detail herein.

The motor speed obtaining part 120 may be configured to obtain a current rotation speed (for example, in rpm) for each of the plurality of motors 200. For example, if the motor 200 is an in-wheel motor coupled to a vehicle wheel, the motor speed obtaining part 120 may include a speed sensor such as an encoder and a hall sensor, and may be configured to detect the current rotation speed of the respective motor 200 using such a sensor.

The OOL torque map 130 is a torque map that defines a torque value corresponding to an optimal operating line (OOL), that is, an optimal operating point torque, for each rotation speed of the respective motor 200. The OOL torque map 130 may be predefined through experiment or simulation for the characteristics of the respective motors 200. The OOL torque map 130 may be stored and used in memory (not shown) in a table format.

The optimal operating point torque determination part 140 may be configured to determine an optimal operating point torque of the respective motor 200 using the OOL torque map 130. In other words, the optimal operating point torque determination part 140 may be configured to obtain the optimal operating point torque of the respective motor 200 from the OOL torque map 130, by inputting the current rotation speed of the respective motor 200 obtained by the motor speed obtaining part 120 to the OOL torque map 130.

When the motor request torque is determined by the request torque determination part 110, the motor torque determination part 160 may be configured to determine a target torque of the respective motor 200 by distributing the motor request torque based on an optimal operating point torque and a maximum limit torque of the respective motor 200. To determine the target torque of the respective motor 200, the motor torque determination part 160 may first be configured to calculate a difference value $T_{diff}$ between the motor request torque and a summation value of an optimal operating point torque $T_{OOL}$ over all the plurality of motors 200, as the following equation 1.

$$T_{diff} = T_M - \sum_{i=1}^{N} T_{OOL}(i) \qquad \text{Equation 1}$$

In the above equation 1, $T_M$ is the motor request torque, $T_{OOL}(i)$ is the optimal operating point torque of an i-th motor 200, and N indicates the quantity of motors.

When the difference value $T_{diff}$ calculated through the above equation 1 is equal to 0, that is, when a summation value of the optimal operating point torque $T_{OOL}$ over all the plurality of motors 200 is equal to the motor request torque, the motor torque determination part 160 may be configured to determine the optimal operating point torque of the respective motor 200 as the target torque of the respective motor 200. When the summation value of the optimal operating point torque $T_{OOL}$ over all the plurality of motors 200 is equal to the motor request torque, that is, the motor torque determination part 160 determines the optimal operating point torque of the respective motor 200 as the target torque of the respective motor 200 thus, the respective motor 200 is responsible for the motor request torque equal to its optimal operating point torque.

Whereas, when the difference value $T_{diff}$ calculated through the above equation 1 is greater than 0, that is, when the summation value of the optimal operating point torque $T_{OOL}$ over all the plurality of motors 200 is different from the motor request torque, the motor torque determination part 160 may be configured to distribute the torque corresponding to the difference value $T_{diff}$ to each motor 200, to be used as a calibration value in determining the target torque of the respective motor 200. In other words, when the torque corresponding to the difference value $T_{diff}$ is distributed to the respective motor 200, the motor torque determination part 160 may be configured to obtain the target torque of the respective motor 200 by calibrating the optimal operating point torque of the respective motor 200 with the distributed torque.

While distributing the torque value corresponding to the difference value $T_{diff}$ to the respective motor 200, the motor torque determination part 160 may be configured to determine a distribution ratio based on the maximum limit torque of the respective motor 200. The maximum limit torque of the respective motor 200 may have a different value based on the motor characteristic and rotation speed of the motor 200. For example, when the current rotation speed of the motor 200 is about 2000 rpm, a maximum limit torque of a first motor may be about 160 Nm, and a maximum limit torque of a second motor may be about 210 Nm. For another example, when the current rotation speed of the motor 200 is about 4000 rpm, the maximum limit torque of the first motor may be about 80 Nm, and the maximum limit torque of the second motor may be about 125 Nm.

The motor torque determination part 160 may use the maximum limit torque map 150, to determine the maximum limit torque of the respective motor 200. The maximum limit torque map 150 is a torque map that defines the maximum limit torque of the respective motor 200 for each rotation speed, and may be predefined through experiment or simulation for the characteristic of the respective motors 200. The maximum limit torque map 150 may be stored and used in memory (not shown) in a table format. In other words, the motor torque determination part 160 may be configured to obtain the maximum limit torque of the respective motor 200 from the maximum limit torque map 150, by inputting the current rotation speed of the respective motor 200 obtained by the motor speed obtaining part 120 to the maximum limit torque map 150.

When the maximum limit torque of the respective motor 200 is obtained, the motor torque determination part 160 may be configured to determine a torque distribution ratio $W_T(i)$ of the respective motor 200, as the following equation 2.

$$W_T(i) = \frac{T_L(i)}{\sum_{i=1}^{N} T_L(i)} \qquad \text{Equation 2}$$

In the above equation 2, $W_T(i)$ is the torque distribution ratio of the i-th motor 200, and $T_L(i)$ is the maximum limit torque of the i-th motor 200.

Referring to the equation 2, the torque distribution ratio $W_T(i)$ of the respective motor 200 may be determined using a ratio of the maximum limit torque of the respective motor 200 with respect to a summation value of the maximum limit torque of all the motors 200. Therefore, when the torque is distributed according to such determined torque distribution ratio $W_T(i)$, more torque may be distributed to the torque having higher maximum limit torque.

As described above, when the torque distribution ratio $W_T(i)$ of the respective motor 200 is determined, the motor torque determination part 160 may be configured to distribute the torque value corresponding to the difference value $T_{diff}$ between the motor request torque and summation value of an optimal operating point torque $T_{OOL}(i)$ over all the motors 200, in accordance with the torque distribution ratio $W_T(i)$ of the respective motor 200. The distributed torque may be used as a torque calibration value for determining the target torque by calibrating the optimal operating point torque of the respective motor 200. The following equation 3 represents a method for determining the target torque of the respective motor 200 by calibrating the optimal operating point torque of the respective motor 200.

$$T_T(i) = T_{OOL}(i) + (T_{diff} \times W_T(i)) \qquad \text{Equation 3}$$

In the above equation 3, TT(i) is target torque of the i-th motor 200.

Referring to the above equation 3, the motor torque determination part 160 may be configured to determine the target torque of the respective motor 200 by adding or subtracting the torque distributed to the respective motor 200 based on the torque distribution ratio $W_T(i)$ to or from (respectively) the optimal operating point torque $T_{OOL}(i)$ of the respective motor 200. In response to determining that a summation value of the optimal operating point torque $T_{OO}L$ over all the motor 200 is less than the motor request torque $T_M$, the motor torque determination part 160 may be configured to determine the target torque of the respective motor 200 by adding the torque distributed to the respective motor 200 to the optimal operating point torque $T_{OOL}(i)$ of the respective motor 200. In response to determining that the summation value of the optimal operating point torque $T_{OOL}$ over all the motor 200 is greater than the motor request torque $T_M$, the motor torque determination part 160 may be configured to determine the target torque of the respective motor 200 by subtracting the torque distributed to the respective motor 200 from the optimal operating point torque $T_{OOL}(i)$ of the respective motor 200. When the target torque of the respective motor 200 is determined by the motor torque determination part 160, the motor controller 160 may be configured to operate the respective motor 200 such that the output torque of the respective motor 200 converges to the target torque.

In the above described motor control system 100 of vehicle, functions and operations of the elements constituting the motor control system 100 of vehicle, that is, the request torque determination part 110, the motor speed obtaining part 120, the optimal operating point torque determination part 140, the motor torque determination part 160, and the motor controller 160 may be performed by at least one controller (for example, hybrid control unit (HCU), motor control unit (MCU)) installed within the vehicle. In addition, such a controller may include a processor that may be implemented as at least one central processing unit (CPU) or another chipset, a microprocessor, and the like.

Figure 2:
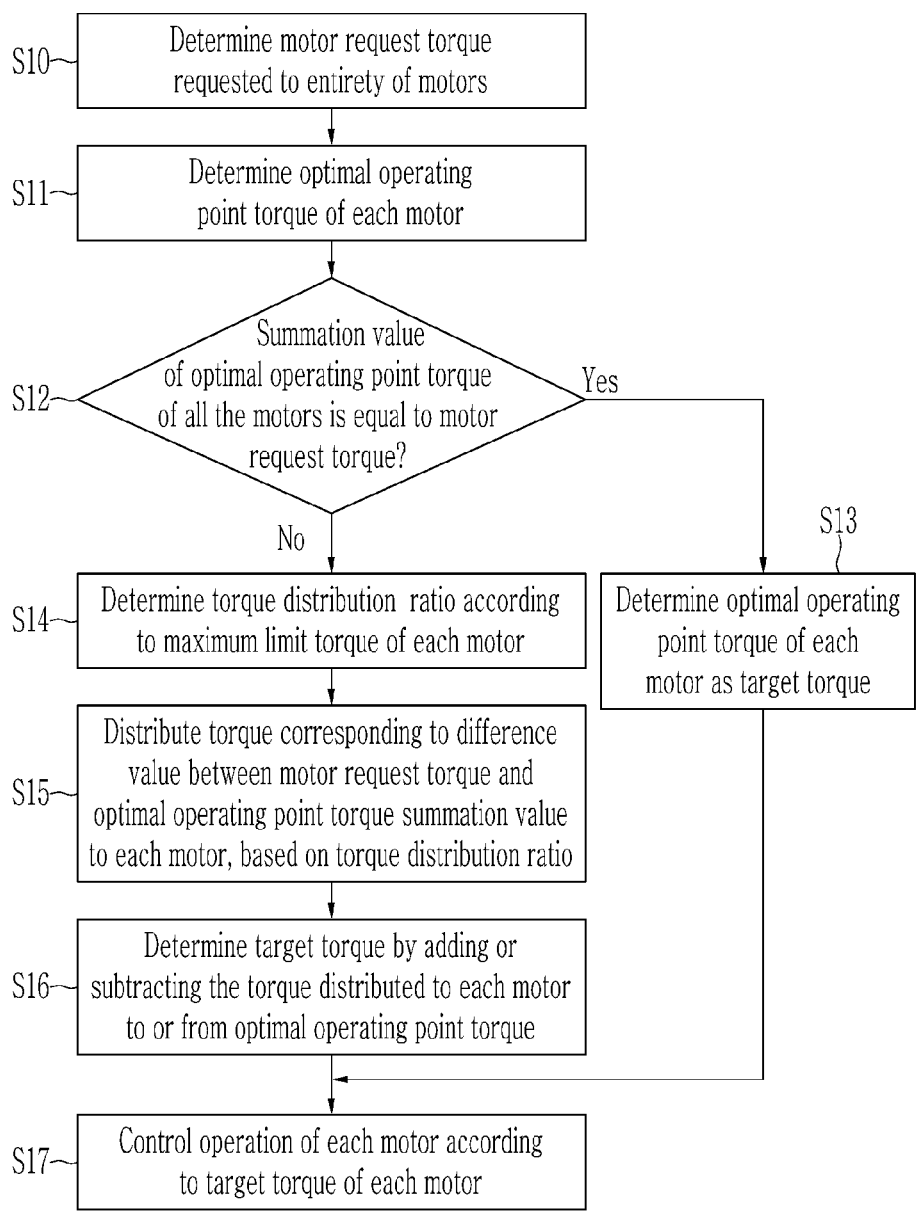
FIG. 2 schematically illustrates a motor control method of a vehicle according to exemplary embodiment.

FIG. 2 schematically illustrates a motor control method of a vehicle according to exemplary embodiment. The method shown in FIG. 2 may be performed by the motor control system 100 of vehicle described above with reference to FIG. 1. The method described herein below may be executed by a controller. Referring to FIG. 2, at step S10, when the driver request torque is determined, the motor control system 100 of vehicle according to an exemplary embodiment may be configured to determine the motor request torque requested to entirety of motors. In particular, the motor control system 100 of vehicle may be configured to determine the driver's request torque based on vehicle driving information (such as an accelerator pedal operation status, a brake pedal operation status, and the like, of the vehicle), vehicle status information (such as a gear stage, a vehicle speed, an engine speed (for example, in rpm), a state of charge (SOC), and the like), environmental parameter (such as road information), and the like.

In addition, at step S11, the motor control system 100 of vehicle may be configured to determine the optimal operating point torque of the respective motor 200 in accordance with the current rotation speed of the respective motor 200. At the step S11, the motor control system 100 of vehicle may be configured to determine the optimal operating point torque of the respective motor 200 using the OOL torque map 130 stored in the memory (not shown). the OOL torque map 130 defines the optimal operating point torque, which is a torque value corresponding to the optimal operating line (OOL) for each rotation speed with respect to the respective motor 200. Therefore, the motor control system 100 of vehicle may be configured to obtain the optimal operating point torque of the respective motor 200 from the OOL torque map 130, by inputting the current rotation speed of the respective motor 200 to the OOL torque map 130.

When the optimal operating point torque of the respective motor 200 is determined, the motor control system 100 of vehicle may be configured to sum all of them to obtain an optimal operating point torque summation value of the entirety of motors 200. In addition, at step S12, the motor control system 100 of vehicle may be configured to compare the obtained summation value of the optimal operating point torque for the entirety of motors 200 with the motor request torque determined through the step S10, and determines whether the two values are equal.

When the optimal operating point torque summation value of the entirety of motors 200 is determined to be equal to the motor request torque at the step S12 (S12—Yes), the motor control system 100 of vehicle may be configured to determine the optimal operating point torque of the respective motor 200 as the target torque of the respective motor 200, at step S13. Whereas, when the optimal operating point torque summation value of the entirety of motors 200 is determined to be different from the motor request torque at the step S12 (S12—No), the motor control system 100 of vehicle may be configured to determine the torque distribution ratio used for distributing a torque corresponding to the difference value of the two values to the respective motor 200 according to the maximum limit torque of the respective motor 200, at step S14. At the step S14, the maximum limit torque of the respective motor 200 may be determined based on the current rotation speed of the respective motor 200.

When the torque distribution ratio of the respective motor 200 is determined through the step S14, the motor control system 100 of vehicle may be configured to distribute the torque corresponding to the difference value between the motor request torque and the optimal operating point torque summation value of the entirety of motors 200, to the respective motor 200, based on the torque distribution ratio of the respective motor 200, at step S15. In addition, at step S16, the motor control system 100 of vehicle may be configured to determine the target torque of the respective motor 200 by adding or subtracting the torque distributed to the respective motor 200 according to the torque distribution ratio to or from the optimal operating point torque of the respective motor 200.

At the step S16, in response to determining that the optimal operating point torque summation value of the entirety of motors 200 is less than the motor request torque, the motor control system 100 of vehicle may be configured to determine the target torque of the respective motor 200 by adding the torque distributed to the respective motor 200 through the step S15 to the optimal operating point torque of the respective motor 200. Whereas, in response to determining that the optimal operating point torque summation value of the entirety of motors 200 is greater than the motor request torque, the motor control system 100 of vehicle may be configured to determine the target torque of the respective motor 200 by subtracting the torque distributed to the respective motor 200 through the step S15 from the optimal operating point torque of the respective motor 200. When the target torque of the respective motor 200 is determined through the above step S13 or step S16, the motor control system 100 of vehicle may be configured to operate the respective motor 200 according to the target torque of the respective motor 200, at step S17.

According to the above-described embodiment, in a vehicle having a plurality of motors as a driving power source, the motor torque control is performed in consideration of the optimal operating line of respective motor, thereby increasing efficiency of the motor, improving fuel efficiency of the vehicle, and improving marketability of the vehicle. The motor control method of the vehicle according to the above-described embodiment may be executed through software. When executed with software, the components of the present disclosure are code segments that execute the necessary steps. Program or code segments may be stored in a processor-readable medium or transmitted by a computer data signal combined with a carrier in a transmission medium or communication network.

The non-transitory computer-readable medium includes all types of recording devices that store data that may be read by a computer system. Examples of computer-readable recording devices include ROM, RAM, CD-ROM, DVD_ROM, DVD_RAM, magnetic tape, floppy disk, hard disk, optical data storage, and the like. In addition, the non-transitory computer-readable medium may be distributed to computer devices connected to one another via a network, such that computer-readable codes may be stored and executed in a distributed manner.

The drawing referenced so far and the detailed description of the described disclosure are merely examples of the present disclosure, which are used only for the purpose of describing the present disclosure, and they are not used for limiting the meaning or the range of the present disclosure described in claims. Therefore, such examples may be easily selected and replaced by those of ordinary skill in the art. In addition, a person of an ordinary skill in the art may omit some of the constituent elements described in this specification without degradation of performance, or add a constituent element to improve performance. In addition, a person of an ordinary skill in the art may change the sequence of the method steps described in this specification according to the process environment or equipment. Therefore, the range of the present disclosure should be determined not by the described embodiment, but by the claims and their equivalents.

DESCRIPTION OF SYMBOLS

100: motor control system
110: request torque determination part
120: motor speed obtaining part
130: optimal operating line torque map
140: optimal operating point torque determination part
150: maximum limit torque map
160: motor torque determination part
160: motor controller
200: motor

What is claimed is:

1. A motor control system of a vehicle having a plurality of motors as a driving power source, the motor control system comprising:
    a request torque determination part including at least one processor configured to determine a request torque requested for the plurality of motors corresponding to a driver request torque;
    an optimal operating point torque determination part including at least one processor configured to determine an optimal operating point torque for each of the plurality of motors according to a current rotation speed of each of the plurality of motors; and
    a motor torque determination part including at least one processor configured to determine a target torque for each of the plurality of motors by distributing the request torque to the plurality of motors based on the optimal operating point torque, and
    wherein the motor torque determination part is further configured to determine the target torque based on a difference value between the request torque and a summation value of the optimal operating point torque over the plurality of motors.

2. The motor control system of claim 1, wherein the motor torque determination part is configured to:
    obtain the difference value between the request torque and the summation value of the optimal operating point torque over the plurality of motors;
    obtain a torque calibration value with respect to each of the plurality of motors by distributing a torque corresponding to the difference value to the plurality of motors; and
    determine the target torque by adding or subtracting the torque calibration value to or from the optimal operating point torque of each the plurality of motors.

3. The motor control system of claim 2, wherein the motor torque determination part is configured to determine a torque distribution ratio for distributing a torque corresponding to the difference value to the plurality of motors according to a maximum limit torque of each of the plurality of motors.

4. The motor control system of claim 3, wherein the motor torque determination part is configured to determine the torque distribution ratio higher for a motor having higher maximum limit torque.

5. The motor control system of claim 3, wherein the motor torque determination part is configured to determine the maximum limit torque according to the current rotation speed of each of the plurality of motors.

6. The motor control system of claim 2, wherein in response to determining that the summation value of the optimal operating point torque over the plurality of motors is equal to the request torque, the motor torque determination part is configured to determine the optimal operating point torque of each of the plurality of motors as the target torque.

7. The motor control system of claim 1, further comprising:
    an optimal operating line torque map that defines the optimal operating point torque corresponding to an optimal operating line for each rotation speed with respect to each of the plurality of motors, wherein the optimal operating point torque determination part is configured to determine optimal operating point torque of each of the plurality of motors using the optimal operating line torque map.

8. The motor control system of claim 1, further comprising a motor controller configured to operate the plurality of motors based on the target torque.

9. A motor control method of a vehicle having a plurality of motors as a driving power source, the motor control method comprising:
   determining, by a controller, a request torque requested for the plurality of motors corresponding to a driver request torque;
   determining, by the controller, an optimal operating point torque for each of the plurality of motors according to a current rotation speed of each of the plurality of motors;
   determining, by the controller, a target torque for each of the plurality of motors by distributing the request torque to the plurality of motors based on the optimal operating point torque; and
   operating, by the controller, the plurality of motors based on the target torque; and
   wherein the deterring of the target torque includes determining the target torque based on a difference value between the request torque and a summation value of the optimal operating point torque over the plurality of motors.

10. The motor control method of claim 9, wherein the determining of the target torque based on the difference value includes:
   obtaining, by the controller, the difference value between the request torque and the summation value of the optimal operating point torque over all the plurality of motors;
   obtaining, by the controller, a torque calibration value with respect to each of the plurality of motors by distributing a torque corresponding to the difference value to the plurality of motors; and
   obtaining, by the controller, the target torque by adding or subtracting the torque calibration value to or from the optimal operating point torque of each the plurality of motors.

11. The motor control method of claim 10, wherein:
   the determining of the target torque based on the difference value further includes determining a torque distribution ratio for distributing a torque corresponding to the difference value to the plurality of motors according to a maximum limit torque of each of the plurality of motors; and
   the obtaining of the torque calibration value includes distributing a torque corresponding to the difference value to the plurality of motors according to the torque distribution ratio of each of the plurality of motors.

12. The motor control method of claim 11, wherein the determining of the torque distribution ratio includes determining the torque distribution ratio higher for a motor having higher maximum limit torque.

13. The motor control method of claim 11, wherein the determining of the target torque further includes determining the maximum limit torque according to the current rotation speed of each of the plurality of motors.

14. The motor control method of claim 9, wherein the determining of the target torque includes determining the optimal operating point torque of each of the plurality of motors as the target torque, in response to determining that a summation value of the optimal operating point torque over all the plurality of motors is equal to the request torque.

15. The motor control method of claim 9, wherein the optimal operating point torque is a torque value corresponding to the current rotation speed in an optimal operating line of each of the plurality of motors.

* * * * *